April 24, 1934.　　　A. J. GRANBERG　　　1,956,281
FLUID METER
Filed July 13, 1931　　2 Sheets-Sheet 1
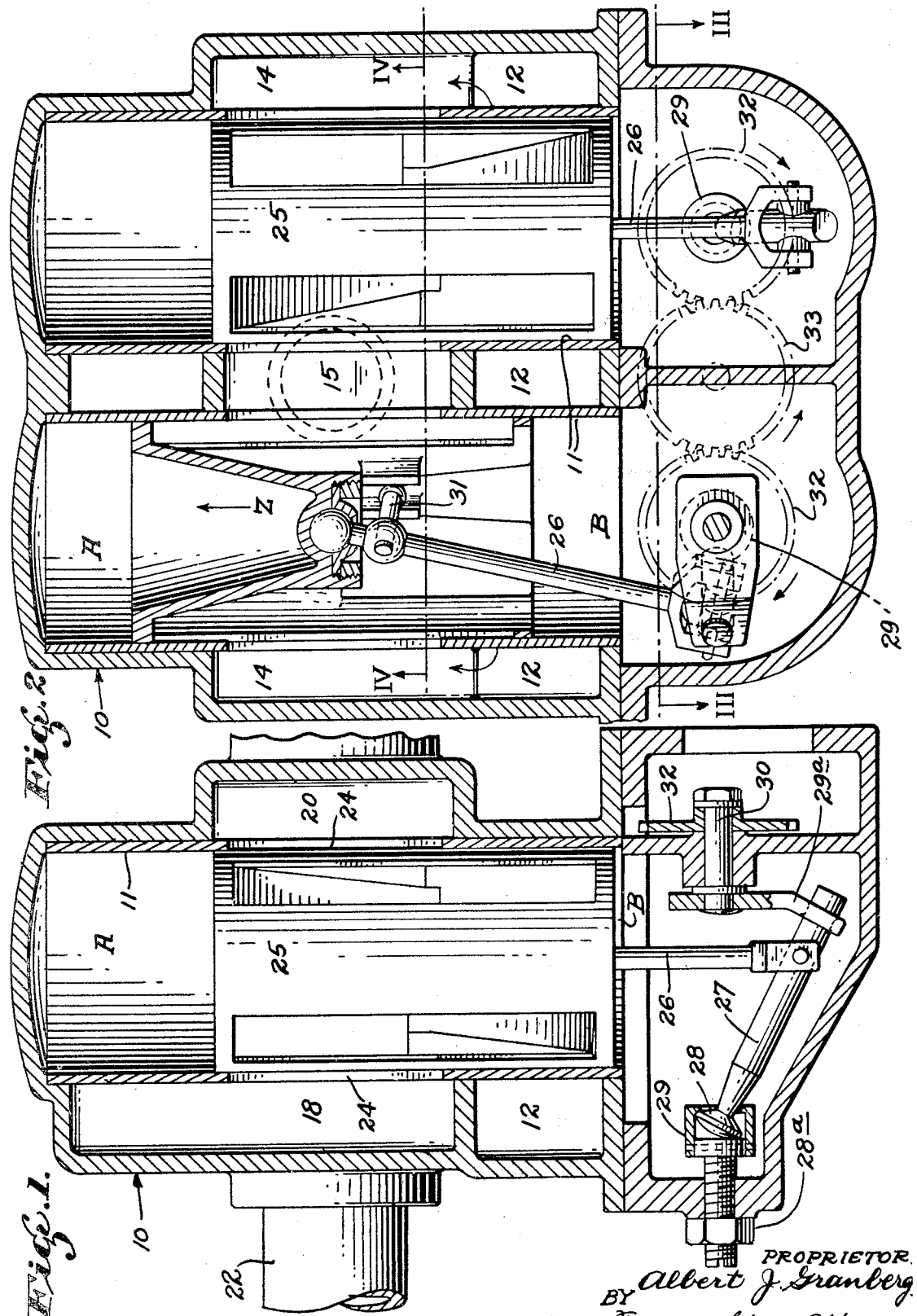

April 24, 1934.  A. J. GRANBERG  1,956,281
FLUID METER
Filed July 13, 1931  2 Sheets-Sheet 2

INVENTOR.
Albert J. Granberg
BY
Townsend, Loftus, Abbett.
ATTORNEYS.

Patented Apr. 24, 1934

1,956,281

UNITED STATES PATENT OFFICE 1,956,281

FLUID METER

Albert J. Granberg, Berkeley, Calif., assignor to Ralph N. Brodie Company, Oakland, Calif., a corporation of California Application July 13, 1931, Serial No. 550,296

6 Claims. (Cl. 73—30)

This invention relates to fluid meters of the displacement type and has for its principal object the provision of an improved fluid meter which is comparatively simple in construction, inexpensive to manufacture and efficient in operation.

In carrying the invention into practice, a fluid meter is provided comprising a casing including a pair of cylinders wherein pistons are reciprocably and turnably mounted. The meter cylinders and pistons are formed with cooperating ports to admit fluid to one end of each cylinder and to permit fluid at the opposite end thereof to be displaced by the piston in the cylinder during each stroke of the piston. The admittance and discharge of fluid in the cylinders is reversed at the end of each piston stroke. In order to accomplish proper registration of the piston and cylinder ports, each piston is fitted with a connecting rod which in turn is connected with a peculiar type of crank which causes the connecting rod to oscillate about its own axis during the reciprocation of the piston. This oscillation is transmitted to the piston to effect properly timed registration of the ports in the piston and cylinder. The cranks of the two pistons are connected together so that the pistons will operate in overlapping cycles and will drive a common indicator mechanism for indicating the volume of the fluid displaced by the pistons.

One form which the invention may assume is exemplified in the following description and illustrated by way of example in the accompanying drawings, in which:

Fig. 1 is a transverse sectional view through a meter embodying the preferred form of my invention.

Fig. 2 is a longitudinal sectional view through the meter taken at right angles to Fig. 1.

Figure 3:
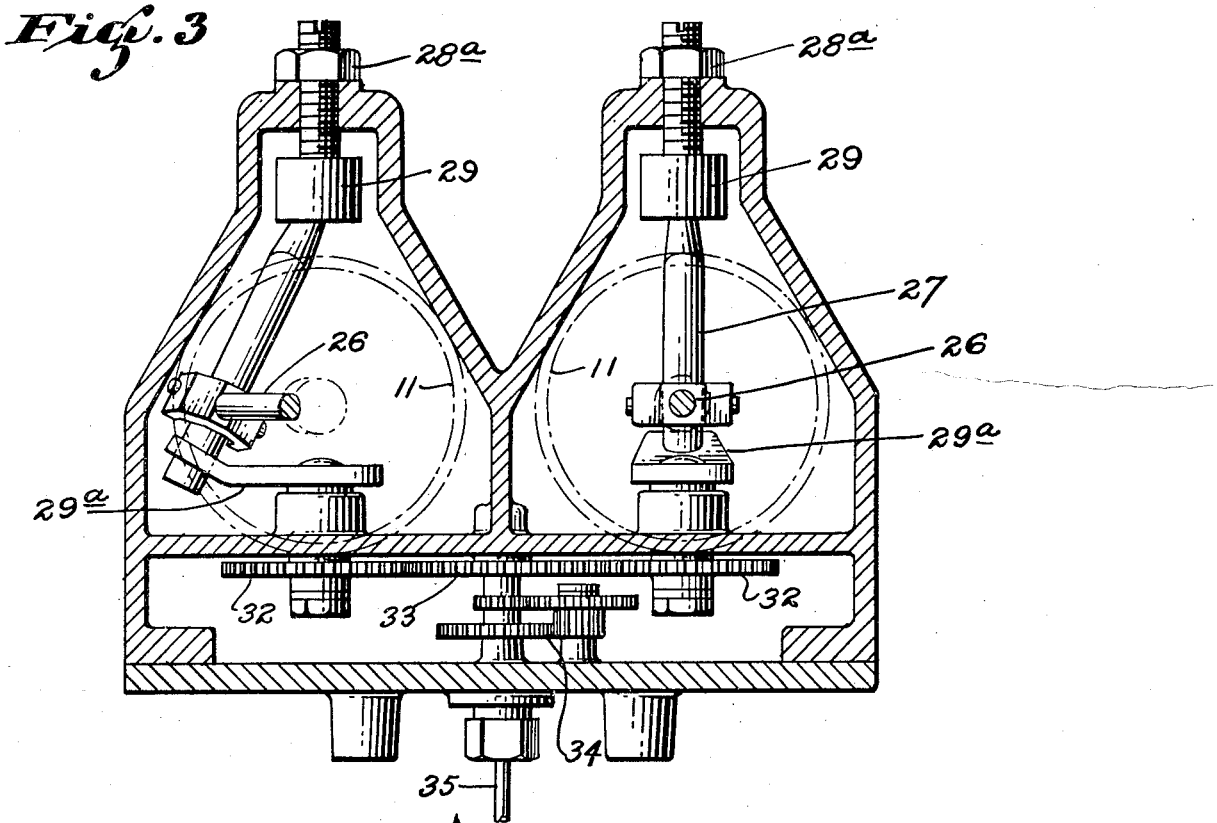
Fig. 3 is a plan sectional view taken on line III—III of Fig. 2.

Referring more particularly to the accompanying drawings, 10 indicates a meter casing formed with two parallel metering cylinders 11. The meter casing 10 is formed with an intake chamber 12 having communicating portions at the outer sides of the cylinders as indicated at 14 and a portion intermediate the cylinders as indicated at 15. These portions of the intake chamber are in communication with each other and with a common inlet port 16 to which a conduit 17 may be connected when the meter is interposed in a pipe line for measuring the volume of fluid passed therethrough.

The meter casing is also formed with an exhaust chamber 18 having a portion overlying the cylinders as at 19 and portions underlying the cylinders as at 20. These portions of the exhaust chamber communicate with each other and with a common exhaust port 21 with which a conduit 22 may be connected. The outlet chamber and exhaust chambers are, of course, separated by suitable walls formed within the casting of the meter casing so that there will be no communication therebetween except through the medium of the cylinders as will be described.

It will be noticed that each cylinder is formed with four ports which are disposed coaxially in the walls thereof at 90° apart and intermediate the ends thereof. That is to say, each cylinder is formed with diametrically opposed intake ports 23 which are in communication with the intake chamber and each cylinder is also formed with two diametrically opposed outlet ports 24 which are arranged intermediate the intake ports. The ports are therefor arranged alternately at 90° apart.

It will be noticed that the intake ports are disposed at the sides of the cylinders while the outlet ports are disposed one at the top and one at the bottom of the cylinders. This enables air to pass out of the meter through the top outlet port and also enables the discharge of heavy gritty matter entering the meter through the bottom outlet ports 24.

Arranged in each cylinder for reciprocation therein a piston 25 which is capable of being reciprocated and oscillated. Each piston is centrally and transversely divided by a suitable partition wall which effectively divides each cylinder into two metering chambers, one being disposed at each end of the cylinder and in the drawings indicated as A and B.

The piston is formed with four ports arranged at 90 degrees apart so that they may register with the cylinder ports. Two piston ports are formed through the wall of the piston and communicate with the metering chamber A in the cylinder, while the opposite two ports are formed through the wall of the piston and communicate with the metering chamber B of the cylinder. It will be noticed that the ports that communicate with the metering chamber A are diametrically opposed and that the ports which communicate with the metering chamber B are likewise diametrically opposed and disposed intermediate the other ports.

It is intended that the pistons be oscillated through an arc of 90 degrees during reciprocation so that in one position one pair of ports will register with the outlet ports 24 in the cylinder while the other pair of ports in the piston will register with the intake ports 23 of the cylinder. When the piston travels through an arc of 90 degrees this disposition of the piston ports will be reversed so that the piston ports previously registering with the intake ports will be placed in register with the outlet ports and the piston ports previously in register with the outlet ports will be placed in register with the intake ports.

At a point midway between these two positions the piston ports will be covered by the cylinder wall and in this position the piston will be at what I prefer to term dead center. For this reason as will be described the pistons are connected together to operate in overlapping cycles so that when one piston is on dead center the other is operating and will act to move the one on dead center to a position where it will continue operating.

By the previously described arrangement of ports fluid will be admitted to one metering chamber through the piston ports and be permitted to discharge from the opposite metering chamber through the other piston ports as displaced by the piston. When a reversal of the ports occurs, fluid will be admitted to the metering chamber just discharged and be permitted to be displaced from the opposite metering chamber. This arrangement of piston ports and cylinders is described and claimed in my copending application entitled Fluid meter, filed April 14, 1930, Serial No. 444,095.

In order to oscillate the pistons during their reciprocation and to operate an indicator through the medium of the piston strokes, each piston is fitted with a connecting rod 26 one end of which is formed with a ball engaging a socket at the center of the piston. The opposite end of the connecting rod is bifurcated and is pivotally connected to a crank pin 27. One end of this crank pin is connected by means of a universal connection 28 to a stationary member 29 about the axis of which the connecting rod end gyrates. The other end of the crank pin 27 is disposed in a position which is eccentric to this axis and at this point is slidably and pivotally connected with a crank arm 29a fixedly secured on a rotatable stub shaft 30 suitably journalled in a bearing formed within the meter casing. It will be noticed from the drawings that the connecting rod is connected to the crank pin at a point intermediate the crank arm 29a and the universal connection 28 but closely adjacent to the crank arm 29a so that as the piston reciprocates, the crank pin will gyrate about an axis common to the member 29 and the crank arm 29a.

Due to this gyrating movement of one end of the crank pin while the other end is maintained on a fixed axis, the connecting rod connected therewith will be caused to oscillate about its axis during its reciprocation through an arc of 90 degrees. That is to say, that it will revolve in one direction through an arc of 90 degrees during one stroke and revolve in the opposite direction through an arc of 90 degrees on its succeeding stroke. This oscillation of the connecting rods is imparted to the pistons to which they are connected so as to effect proper registration of the piston ports with the cylinder ports so that the fluid will reciprocate the pistons.

In order to impart this oscillation of the connecting rods to the pistons, it will be seen that the connecting rods are each provided with a fixed right angularly extending arm 31 having a ball at its outermost end which slidably engages a socket in the piston adjacent its periphery so that oscillation of the connecting rods will be accompanied by oscillation of the pistons. There is play between the ball and the socket to enable the stroke of the piston to be adjusted.

In order that the pistons will operate in synchronism and in overlapping cycles the stub shaft 30 associated with each piston is fixedly fitted with a spur gear 32 which are connected together through the medium of an interposed gear 33 which is adapted to drive an indicator drive mechanism 34 which includes a counter or indicator drive shaft 35. The crank arms 29a of each stub shaft are arranged at 90 degrees apart so that the pistons will operate in overlapping cycles. Through this synchronized action of the pistons one piston will act to move the other over dead center so that the operation of the meter will be continuous during the period that fluid under pressure is delivered to the inlet port 16 thereof.

In order that the volume of liquid displaced by the pistons will agree with that indicated by any suitable counter driven by the counter drive shaft 35, it is necessary to vary the piston strokes so as to vary the volume displaced thereby. In order to vary the piston strokes, I have provided means for varying the angularity of the crank pins 27 and by varying the angularity of these crank pins I am successful in varying the length of the connecting rod strokes and thereby accomplishing adjustment.

It will be noticed that the member 29 of each crank pin is threaded through the adjacent wall of the meter casing and may be advanced or retracted in a coaxial direction toward or away from the adjacent crank arm 29a. By advancing or retracting the member 29 toward or away from the crank arm 29a, the angularity of the crank pin 27 is changed and by varying this angle of the crank pin 27 the radius of the circle about which the lower end of the connecting rod travels is varied. It will be noticed that the angle of the crank pin 27 can be changed due to the fact that the end thereof which engages the crank arm 29a slidably engages the latter.

Figure 4:
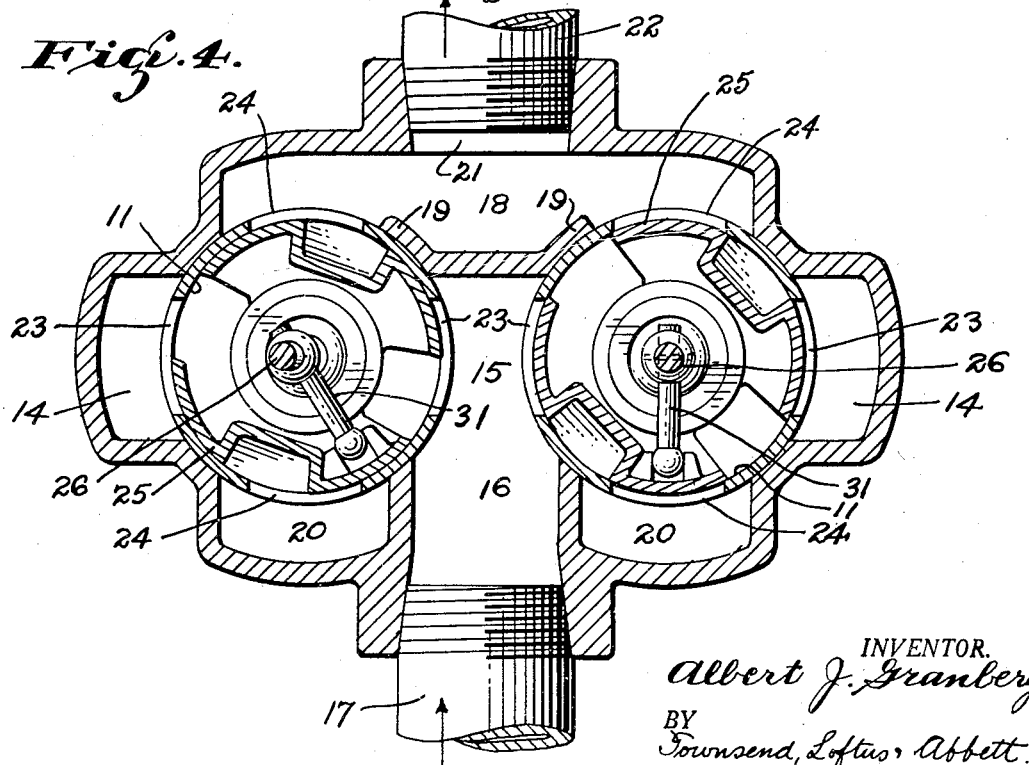
Fig. 4 is a plan section taken on line IV—IV of Fig. 2.

In operation of of the device, it is constructed and assembled substantially as shown in the accompanying drawings and assuming that the meter is interposed in a pipe line conveying liquid under pressure and that the piston ports are in the position shown in Fig. 4, fluid will enter through the intake ports into the metering chamber B and fluid in the metering chamber A will be displaced and may discharge through the outlet ports and therefore the piston in this cylinder will be moving in the direction of the arrow Z in the Fig. 2. As this movement of the piston will be imparted to the connecting rod, the latter through the medium of the crank pin 27 and crank arm 29a will revolve the stub shaft 30 and through the medium of the gears 32 and 33 impart movement to the stub shaft 30 of the other cylinder and move the same off of dead center so that it will be placed in operation.

From Figs. 1 and 2 it will be seen that operation of the connecting rod will, through the medium of the eccentric end of the crank pin 27, revolve the stub shaft 30 through the crank arm 29a and due to the fact that the other end of the crank pin is held on the axis about which its eccentric end revolves, oscillation of the connecting rod will result, which oscillation will be imparted to the piston to which the connecting rod is connected so as to effect the registration of the piston ports with the cylinder ports as previously described so that the piston will be reciprocated by the fluid alternately delivered to the opposite metering chambers and simultaneously discharged from the metering chamber opposite that to which fluid is being delivered.

As the crank arms 29a are disposed at 90 degrees apart, the cylinders will operate in synchronism and in overlapping cycles and the volume of fluid displaced by the pistons will be indicated on a counter mechanism driven from the counter drive shaft 35 operated through the operation of the pistons.

In the event that it is necessary to change the strokes of the pistons so that the volume of fluid displaced in the meter by the pistons will agree with the volume indicated on the counter, the strokes of either or both pistons may be regulated. To adjust the stroke of one piston the member 29 associated with the crank pin 27 of such piston is moved coaxially by rotating it, which movement of the member 29 will be accompanied by change in angularity of the crank pin 27 and change the length of the piston stroke. Axial movement of the member 29 results when it is revolved due to its threaded connection with the meter casing, a lock nut 28a being provided to secure the same in any set position.

From the foregoing it is obvious that I have provided a simple and efficient meter for measuring fluid and while I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A meter comprising a meter casing having an intake and an exhaust chamber, a pair of metering cylinders, a piston in each cylinder, said pistons being adapted to be reciprocated by fluid from the intake chamber, said metering cylinders and said pistons having cooperating ports to admit fluid from said intake chamber to one end of each cylinder and to permit fluid at the opposite end of each cylinder to be displaced by the piston therein and to be passed to said exhaust chamber during each stroke of the latter, a connecting rod connected with each piston whereby each piston and its rod will reciprocate in unison and rotation of the connecting rod about its axis will be accompanied by similar rotation of each piston, a crank pin for each piston, one end of each crank pin being mounted on the axis about which the free end of each connecting rod of the piston gyrates, a revoluble crank arm supporting the other end of each crank pin at an eccentric point relative to said axis, the connecting rod and crank pin of each piston being pivotally connected whereby reciprocation of the pistons will operate the crank pins and effect oscillation of the pistons and cooperation of the ports, a connection between the crank arms of the pistons whereby the latter will operate in overlapping cycles, and an indicator drive mechanism operatively connected to the crank arms whereby rotation of the latter will be accompanied by operation of the drive mechanism.

2. A meter comprising a meter casing having an intake and an exhaust chamber, a pair of metering cylinders, a piston in each cylinder, said pistons being adapted to be reciprocated by fluid from the intake chamber, said metering cylinders and said pistons having cooperating ports to admit fluid from said intake chamber to one end of each cylinder and to permit fluid at the opposite end of each cylinder to be displaced by the piston therein and to be passed to said exhaust chamber during each stroke of the latter, a connecting rod connected with each piston whereby each piston and its rod will reciprocate in unison and rotation of the connecting rod about its axis will be accompanied by similar rotation of each piston, a crank pin for each piston, one end of each crank pin being mounted on the axis about which the free end of each connecting rod of the piston gyrates, a revoluble crank arm supporting the other end of each crank pin at an eccentric point relative to said axis, the connecting rod and crank pin of each piston being pivotally connected whereby reciprocation of the pistons will operate the crank pins and effect oscillation of the pistons and cooperation of the ports, a connection between the crank arms of the pistons whereby the latter will operate in overlapping cycles, means for varying the piston strokes by varying the position of the crank pins, and an indicator drive mechanism connected to and operated by the crank arms.

3. A meter comprising a meter casing having an intake and an exhaust chamber, a pair of metering cylinders, a piston in each cylinder, said pistons being adapted to be reciprocated by fluid from the intake chamber, said metering cylinders and said pistons having cooperating ports to admit fluid from said intake chamber to one end of each cylinder and to permit fluid at the opposite end of each cylinder to be displaced by the piston therein and to be passed to said exhaust chamber during each stroke of the latter, a connecting rod connected with each piston whereby each piston and its rod will reciprocate in unison and rotation of the connecting rod about its axis will be accompanied by similar rotation of each piston, a crank pin for each piston, one end of each crank pin being supported on the axis about which the free end of each connecting rod of the piston gyrates, a revoluble crank arm supporting the other end of each crank pin at an eccentric point relative to said axis, the connecting rod and crank pin of each piston being pivotally connected whereby reciprocation of the pistons will operate the crank pins and effect oscillation of the pistons and cooperation of the ports, a connection between the crank arms whereby the pistons will operate in synchronism and in overlapping cycles, an indicator drive mechanism and a driving connection between the same and one of the crank arms.

4. A meter comprising a meter casing having an intake and an exhaust chamber, a pair of metering cylinders, a piston in each cylinder, said pistons being adapted to be reciprocated by fluid from the intake chamber, said metering cylinders and said pistons having cooperating ports to admit fluid from said intake chamber to one end of each cylinder and to permit fluid at the opposite end of each cylinder to be displaced by the piston therein and to be passed to said exhaust chamber during each stroke of the latter, a connecting rod connected with each piston whereby each piston and its rod will reciprocate in unison and rotation of the connecting rod about its axis will be accompanied by similar rotation of each piston, a crank pin for each piston, means connecting said crank pins for synchronous movement to correlate the movement of the pistons, said crank pins being angularly disposed relative to the axes about which the free ends of the connecting rods gyrate, a pivotal connection between the crank pins and the connecting rods whereby said connecting rods will oscillate about their own axes when the pistons reciprocate to oscillate the pistons and effect cooperation between the ports, said means including crank arms carrying said crank pins, and an indicator drive mechanism operatively connected to said crank arms.

5. A meter comprising a meter casing having an intake and an exhaust chamber, a pair of metering cylinders, a piston in each cylinder, said pistons being adapted to be reciprocated by fluid from the intake chamber, said metering cylinders and said pistons having cooperating ports to admit fluid from said intake chamber to one end of each cylinder and to permit fluid at the opposite end of each cylinder to be displaced by the piston therein and to be passed to said exhaust chamber during each stroke of the latter, a connecting rod connected with each piston whereby each piston and its rod will reciprocate in unison and rotation of the connecting rod about its axis will be accompanied by similar rotation of each piston, a crank pin for each piston, said crank pins being angularly disposed relative to the axes about which the ends of the connecting rods gyrate, a pivotal connection between the crank pins and the connecting rods whereby said connecting rods will oscillate about their own axes when the pistons reciprocate to oscillate the pistons and effect cooperation between the ports, a connection between the crank pins whereby the pistons will operate in synchronism and in overlapping cycles, including crank arms carrying said crank pins, and an indicator drive mechanism operatively connected to the crank arms.

6. A meter comprising a meter casing having an intake and an exhaust chamber, a pair of metering cylinders, a piston in each cylinder, said pistons being adapted to be reciprocated by fluid from the intake chamber, said metering cylinders and said pistons having cooperating ports to admit fluid from said intake chamber to one end of each cylinder and to permit fluid at the opposite end of each cylinder to be displaced by the piston therein and to be passed to said exhaust chamber during each stroke of the latter, a connecting rod connected with each piston whereby each piston and its rod will reciprocate in unison and rotation of the connecting rod about its axis will be accompanied by similar rotation of each piston, a crank pin for each piston, said crank pins being angularly disposed relative to the axes about which the ends of the connecting rods gyrate, a pivotal connection between the crank pins and the connecting rods whereby said connecting rods will oscillate about their own axes when the pistons reciprocate to oscillate the pistons and effect cooperation between the ports, means for varying the angularity of said crank pins and thereby vary the piston strokes, a connection between the crank pins whereby the pistons will operate in synchronism and in overlapping cycles, including crank arms carrying said crank pins, and an indicator drive mechanism operatively connected to the crank arms.

ALBERT J. GRANBERG.